(No Model.)

C. L. COFFIN.
PROCESS OF ELECTRIC METAL WORKING.

No. 483,428. Patented Sept. 27, 1892.

WITNESSES
Geo. H. Lothrop
Gertrude H. Anderson

INVENTOR
Charles L. Coffin

UNITED STATES PATENT OFFICE.

CHARLES L. COFFIN, OF DETROIT, MICHIGAN.

PROCESS OF ELECTRIC METAL-WORKING.

SPECIFICATION forming part of Letters Patent No. 483,428, dated September 27, 1892.

Application filed February 8, 1892. Serial No. 420,753. (No specimens.)

*To all whom it may concern:*

Be it known that I, CHARLES L. COFFIN, of Detroit, in the county of Wayne and State of Michigan, have invented a new and useful Improvement in Processes of Electrically Welding or Heating Metals, of which the following is a specification.

My invention consists of an improved process of electrically welding or heating metals, hereinafter fully described and claimed.

Figure 3:
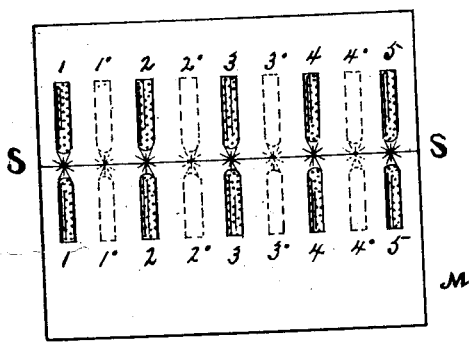
Figure 4:
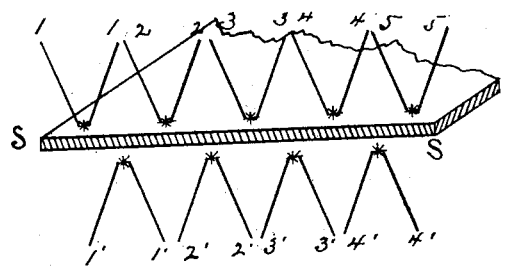
Figure 1:
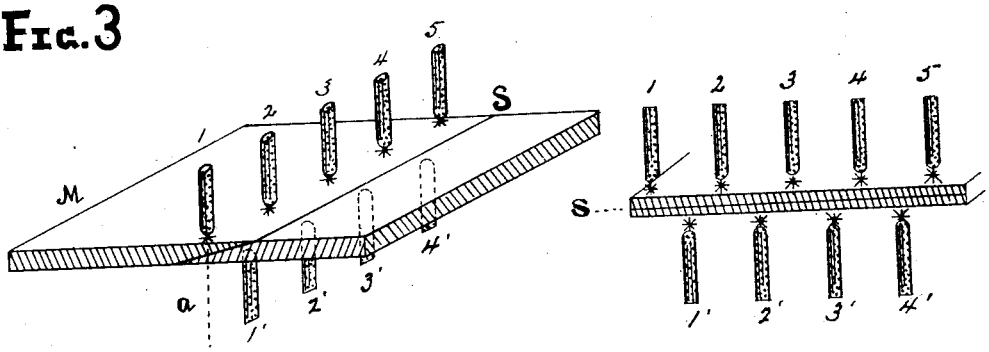
Figure 2:
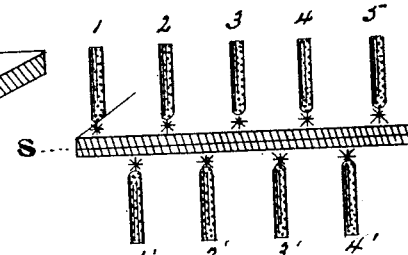

Figure 1 is a perspective, and Fig. 2 is an elevation, on line $a$, Fig. 1, showing my process applied to that system of electric welding in which an arc is sprung between the material in circuit and an extraneous conductor. Fig. 3 is a top plan view; and Fig. 4 is a section similar to Fig. 2, showing my invention applied to that process of electric welding in which the material is subjected to the action of an arc sprung between two extraneous conductors.

In all the figures, M represents material to be heated or welded, S represents the line of seam or weld along which the metal is to be heated, and the figures represent extraneous conductors, usually carbons.

Referring to Figs. 1 and 2, M represents two plates of metal between which a scarf-joint is to be made. The material M is connected with one pole or similar poles of a number of generators of electricity—as, for instance, the terminal or terminals of the secondary or secondaries of a transformer—and each of the conductors 1, 2, 3, 4, and 5, and 1' 2' 3' 4', &c., is connected with the other pole or poles. The conductors 1, 2, 3, 4, and 5 are placed above the material M, and on being brought into contact with said material and then slightly separated therefrom the arcs are formed between said conductors and the material, by which the material is brought to a welding heat. The conductors 1' 2' 3' 4', &c., are placed under material M, brought in contact therewith, separated therefrom, by which means voltaic arcs are formed between said conductors and the material to heat the material from the under side.

I have found by experience that, while it is very desirable in many cases to thus heat the metal simultaneously from both sides, if the conductors 1 and 1' be placed opposite each other the tendency is to draw one of the arcs, as from conductor 1, toward the metal and repel the arc from conductor 1' away from the metal, and the close proximity and opposition of the arcs render regulation difficult, by reason of magnetic or amperian or current effects, this tendency being strongest when the metal M is a magnetic metal, such as iron. I find it necessary in order to avoid this to alternate the upper and lower conductors 1 1' 2 2', &c., (shown in the drawings,) in which case this tendency does not exist or is greatly modified or lessened and both the upper and lower arcs act regularly on the metal.

In Figs. 1 and 3 the material M is subjected along the seam to the action of arcs formed above the metal by pairs of extraneous conductors 1 1, 2 2, 3 3, 4 4, and 5 5, connected to suitable source or sources of electric energy, and to arcs formed below the material by pairs of extraneous conductors 1' 1', 2' 2', 3' 3', 4' 4', &c., connected to suitable source or sources of electric energy, and these are arranged in the same manner as above described, the arc formed by conductors 1' 1' below the material being between the arcs formed by conductors 1 1 and 2 2 above the material. When the metal is sufficiently heated it may be welded or worked in any desired manner.

What I claim as my invention, and desire to secure by Letters Patent, is—

The herein-described process of heating metal, consisting in subjecting the opposite sides of the metal simultaneously to the action of voltaic arcs alternated in position.

CHARLES L. COFFIN.

Witnesses:
GEO. H. LOTHROP,
GERTRUDE H. ANDERSON.